United States Patent

Shibahata et al.

[11] Patent Number: 6,059,067
[45] Date of Patent: May 9, 2000

[54] YAW MOMENT CONTROL PROCESS AND APPARATUS FOR A VEHICLE

[75] Inventors: Yasuji Shibahata; Atsushi Mori; Katsuhiro Kitamura; Kenji Honda; Nobuharu Kuriki; Shinji Ohkuma, all of Saitama, Japan

[73] Assignee: Honda Giken Kogyo Kabushiki Kaisha, Tokyo, Japan

[21] Appl. No.: 08/857,563

[22] Filed: May 16, 1997

[30] Foreign Application Priority Data

May 22, 1996 [JP] Japan ................................ 8-126888
Nov. 15, 1996 [JP] Japan ................................ 8-305216

[51] Int. Cl.[7] .................................................. B60K 17/00
[52] U.S. Cl. ............................................ 180/338; 180/337
[58] Field of Search ................................. 180/338, 337; 701/51, 69, 88

[56] References Cited

U.S. PATENT DOCUMENTS

| 4,690,239 | 9/1987 | Takahashi et al. ................ 180/249 |
| 5,183,131 | 2/1993 | Naito ................................ 180/233 |
| 5,396,421 | 3/1995 | Niikura et al. .................. 364/424.1 |
| 5,742,917 | 4/1998 | Matsuno ............................ 701/69 |
| 5,819,194 | 10/1998 | Hara et al. ...................... 701/89 |

FOREIGN PATENT DOCUMENTS 1-182127  7/1989  Japan.

Primary Examiner—J. J. Swann
Assistant Examiner—Michael Cuff
Attorney, Agent, or Firm—Arent Fox Kintner Plotkin & Kahn PLLC

[57] ABSTRACT

A feed-forward control section controls, in a feed-forward manner, left and right hydraulic clutches $C_L$ and $C_R$ of a driving force distributing device by presuming such a driving force distribution amount $\Delta T$ that a yaw rate corresponding to a turning state of a vehicle is obtained, based on an engine torque, an engine revolution-number, a vehicle speed, a steering angle and a lateral acceleration. On the other hand, a feedback control section calculates a deviation between a reference yaw rate calculated from the vehicle speed and the lateral acceleration and an actual yaw rate detected by a yaw rate sensor, and corrects the driving force distribution amount $\Delta T$ calculating in the driving force distributing device in order to converge the deviation into zero. Therefore, even if the driving force distribution amount becomes excessive due to the feed-forward control to produce an over-steering tendency in the vehicle, this over-steering tendency can be eliminated by the feedback control to stabilize the behavior of the vehicle.

2 Claims, 17 Drawing Sheets

YAW MOMENT CONTROL PROCESS AND APPARATUS FOR A VEHICLE

BACKGROUND OF THE INVENTION

1. Field of the Invention:

The present invention relates to a yaw moment control process in a vehicle for controlling the yaw moment of the vehicle during maneuvering by distributing a driving force or a braking force to left and right wheels of the vehicle.

2. Description of the Related Art:

A yaw moment control process is conventionally known from Japanese Patent Application Laid-open No.1-182127, in which in a driving force distributing device for distributing a driving force to left and right wheels to control the yaw moment, the driving force distribution amount is subjected to feed-forward control based on an accelerator opening degree, an engine revolution-number, a vehicle speed, a steering force and a lateral acceleration.

In the known process, highly responsive control can be performed by the employment of the feed-forward control, but accuracy of the control cannot necessarily be provided because a feedback control is not carried out.

SUMMARY OF THE INVENTION

Accordingly, it is an object of the present invention to reconcile the responsiveness and the accuracy of the control in the process for controlling the yaw moment by distributing the driving force or the braking force to the left and right wheels of the vehicle.

To achieve the above object, according to a first aspect and feature of the present invention, a yaw moment control process in a vehicle controls the yaw moment by distributing a driving force or a braking force to left and right wheels of the vehicle. The process includes the steps of determining a distribution amount of the driving force or braking force by a feed-forward control, and decreasing the distribution amount by a feedback control, when an over-steered state of the vehicle is detected.

With this first feature, the distribution amount of the driving force or the braking force is determined by the feed-forward control. Therefore, it is possible to control the yaw moment of the vehicle in a highly responsive manner without unnecessary delay. Moreover, since the distribution amount is decreased by the feedback control, when the over-steered state of the vehicle is detected, the over-steering tendency can be effectively eliminated such that the behavior of the vehicle is stabilized.

According to a second aspect and feature of the present invention, a first operation amount outputted to a pressure regulating means is subjected to the feed-forward control to eliminate an influence exerted to the output hydraulic pressure by the oil temperature, and a second operation amount is subjected to a feedback control to decrease the control deviation between an output hydraulic pressure and the hydraulic pressure target value.

With the second feature, it is possible to perform a hydraulic pressure control with a high accuracy by use of the feed-forward control of an excellent responsiveness and the feedback control of an excellent convergence in combination. A feed-forward control means controls the hydraulic pressure based on the hydraulic oil temperature. Therefore, it is possible to effectively eliminate the reduction in responsiveness of operation of a hydraulic actuator. Furthermore, a large-capacity accumulator and a large-diameter linear solenoid valve are not required. It is therefore possible to utilize the yaw moment control process of the present invention in an effective manner at an extremely low cost.

BRIEF DESCRIPTION OF THE DRAWINGS

The above and other objects, features and advantages of the invention will become apparent from the following description of the preferred embodiment taken in conjunction with the accompanying drawings, wherein.

DETAILED DESCRIPTION OF THE PREFERRED EMBODIMENTS

Figure 1:
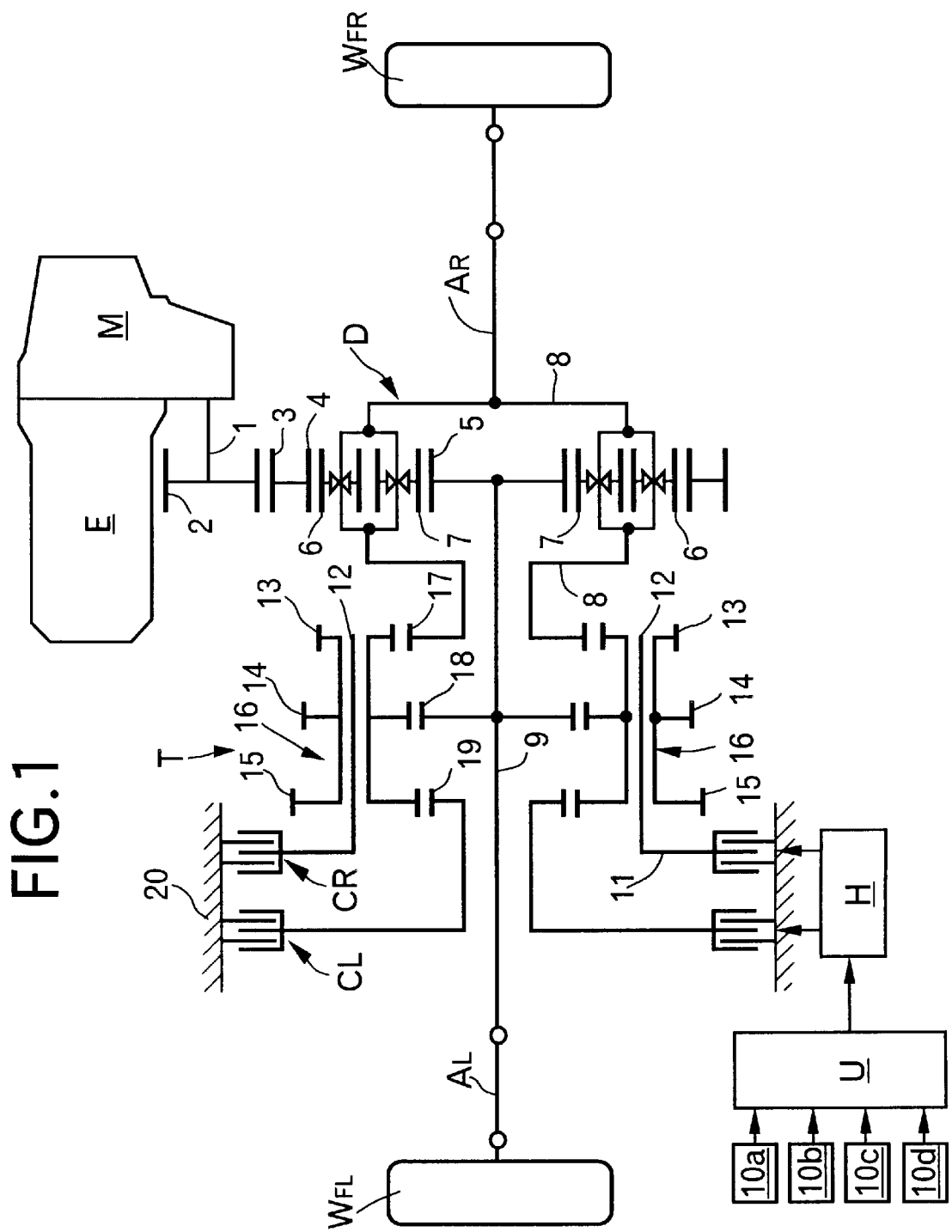
FIG. 1 is a schematic illustration showing a power transmitting system in a vehicle according to the invention.

Referring to FIG. 1, a transmission M is connected to a right end of an engine E which is laterally mounted at a front portion of a vehicle body, and a driving force distributing device T is disposed in rear of the engine E and the transmission M. A left front wheel $W_{FL}$ and a right front wheel $W_{FR}$, which are driven wheels of the vehicle, are respectively connected to a left drive shaft $A_L$ and a right drive shaft $A_R$ which extend respectively leftwards and rightwards from left and right ends of the driving force distributing device T.

The driving force distributing device T includes a differential D to which a driving force is transmitted from an external-tooth gear 3 meshed with an input gear 2 provided on an input shaft 1 extending from the transmission M. The differential D is comprised of a double-pinion type planetary gear mechanism, and includes a ring gear 4 formed integrally with the external-tooth gear 3, a sun gear 5 coaxially disposed in the ring gear 4, and a planetary carrier 8 which carries outer planetary gears 6 meshed with the ring gear 4 and inner planetary gears 7 meshed with the sun gear 5 in a state in which they are meshed with each other. In the differential D, the ring gear 4 functions as an input element, and the sun gear 5, which functions as one of output elements, is connected to the left drive shaft $A_L$ through a half shaft 9, while the planetary carrier 8, which functions as the other output element, is connected to the right drive shaft $A_R$.

A carrier member 11 is rotatably supported around an outer periphery of the half shaft 9 and includes four pinion shafts 12 circumferentially disposed at distances of 90° around half shaft 9. Three-throw pinion members 16 each having first, second and third pinions 13, 14 and 15 integrally formed thereon are rotatably supported on pinion shafts 12. The number of the three-throw pinion members 16 utilized in the discussed embodiment is four, but need not limited to four, and may be two or more.

A first sun gear 17 is rotatably supported around the outer periphery of the half shaft 9 and meshed with the first pinion 13, and is connected to the planetary carrier 8 of the differential D. A second sun gear 18 is fixed to the outer periphery of the half shaft 9, and is meshed with the second pinion 14. Further, a third sun gear 19 is rotatably supported at the outer periphery of the half shaft 9, and is meshed with the third pinion 15.

The number of teeth of each of the first pinion 13, the second pinion 14, the third pinion 15, the first sun gear 17, the second sun gear 18 and the third sun gear 19 in the embodiment is as follows:

Number of teeth of the first pinion 13 $P_1=16$
Number of teeth of the second pinion 14 $P_2=16$
Number of teeth of the third pinion 15 $P_3=32$
Number of teeth of the first sun gear 17 $S_1=30$
Number of teeth of the second sun gear 18 $S_2=26$
Number of teeth of the third sun gear 19 $S_3=28$ Therefore, if a gear ratio of the first pinion 13 to the first sun gear 17 meshed with each other is represented by $R_1(=P_1/S_1)$, a gear ratio of the second pinion 14 to the second sun gear 18 meshed with each other is represented by $R_2(=P_2/S_2)$, and a gear ratio of the third pinion 15 to the third sun gear 19 meshed with each other is represented by $R_3(=P_3/S_3)$, then $R_1:R_2:R_3=16/30:16/26:32/28=1.00:1.15:2.14$ The third sun gear 19 is capable of being coupled to a casing 20 through a left hydraulic clutch $C_L$, and the number of revolutions of the carrier member 11 is increased by engagement of the left hydraulic clutch $C_L$. The carrier member 11 is capable of being coupled to the casing 20 through a right hydraulic clutch $C_R$, and the number of revolutions of the carrier member 11 is decreased by engagement of the right hydraulic clutch $C_R$.

The left and right hydraulic clutches $C_L$ and $C_R$ are controlled through a hydraulic pressure circuit H by an electronic control unit U. Signals from a vehicle speed sensor 10a, a steering angle sensor 10b, a lateral acceleration sensor 10c and a yaw rate sensor 10d are inputted to electronic control unit U.

Figure 2:
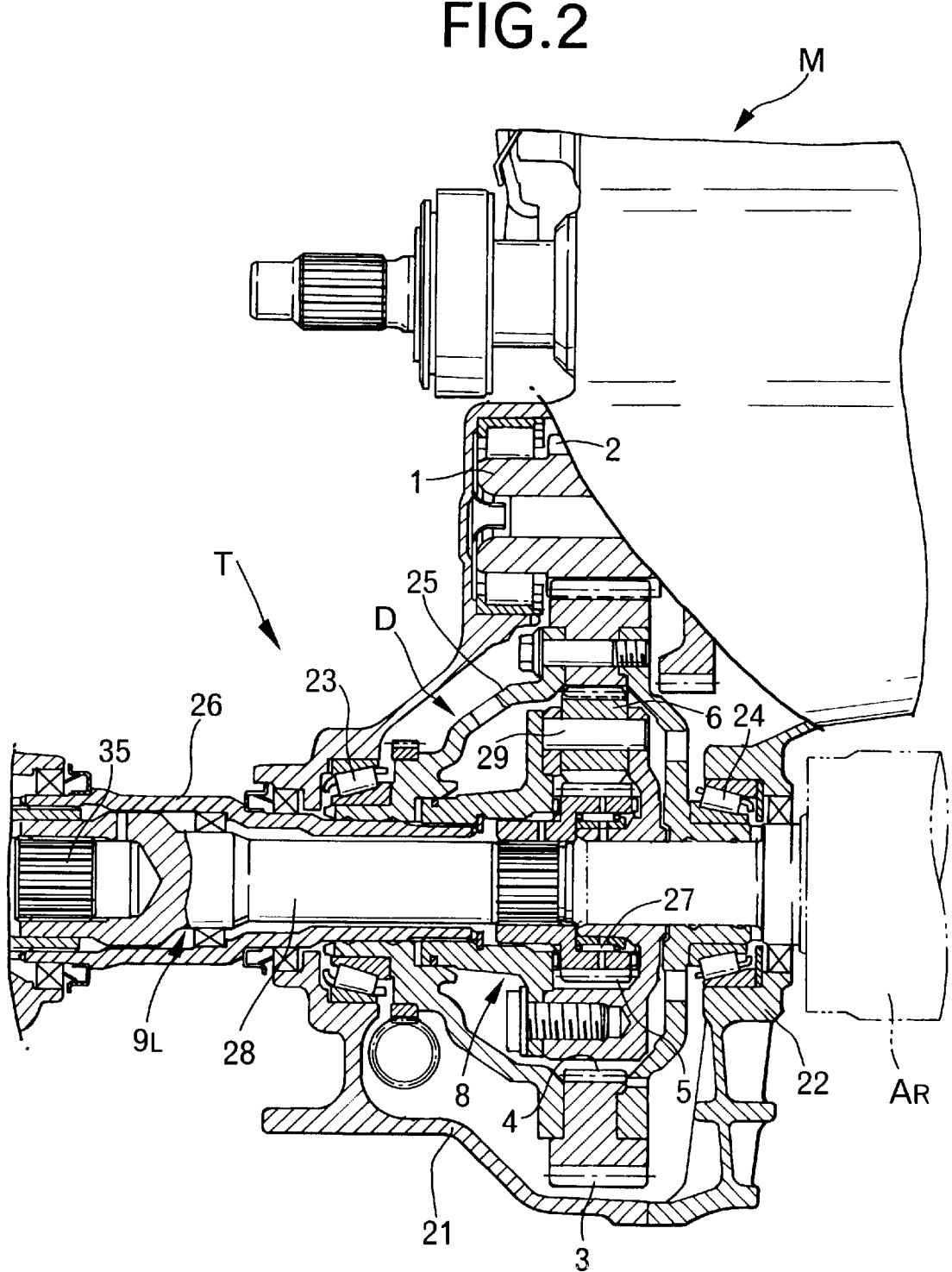
FIG. 2 is a detailed view of a differential according to the invention.

The differential D, as illustrated in FIG. 2, is accommodated within a left casing section 21 and a right casing section 22 which form a casing of the transmission M. A differential gear box 25 having the external-tooth gear 3 around an outer periphery thereof is rotatably supported on a roller bearing 23 mounted in the left casing section 21 and a roller bearing 24 mounted in the right casing section 22. The planetary carrier 8 is rotatably supported within the differential gear box 25. A first sleeve 26, spline-coupled to the center of a left side of the planetary carrier 8, extends leftwards through the differential gear box 25 and the left casing section 21, and a right drive shaft $A_R$ spline-coupled to the center of a right side of the planetary carrier 8 extends rightwards through the differential gear box 25 and the right casing section 22.

A right shaft half 28 of the half shaft 9 divided into two portions is spline-coupled to the center of the sun gear 5 which is rotatably supported at the center of the planetary carrier 8 through a needle bearing 27. The outer planetary gears 6, meshed with the ring gear 4 mounted in the differential gear box 25, and the inner planetary gears 7 meshed with the sun gear 5 (only the outer planetary gears 6 are shown in FIG. 2), are supported on a plurality of planetary gear shafts 29 mounted on the planetary carrier 8.

Figure 3:
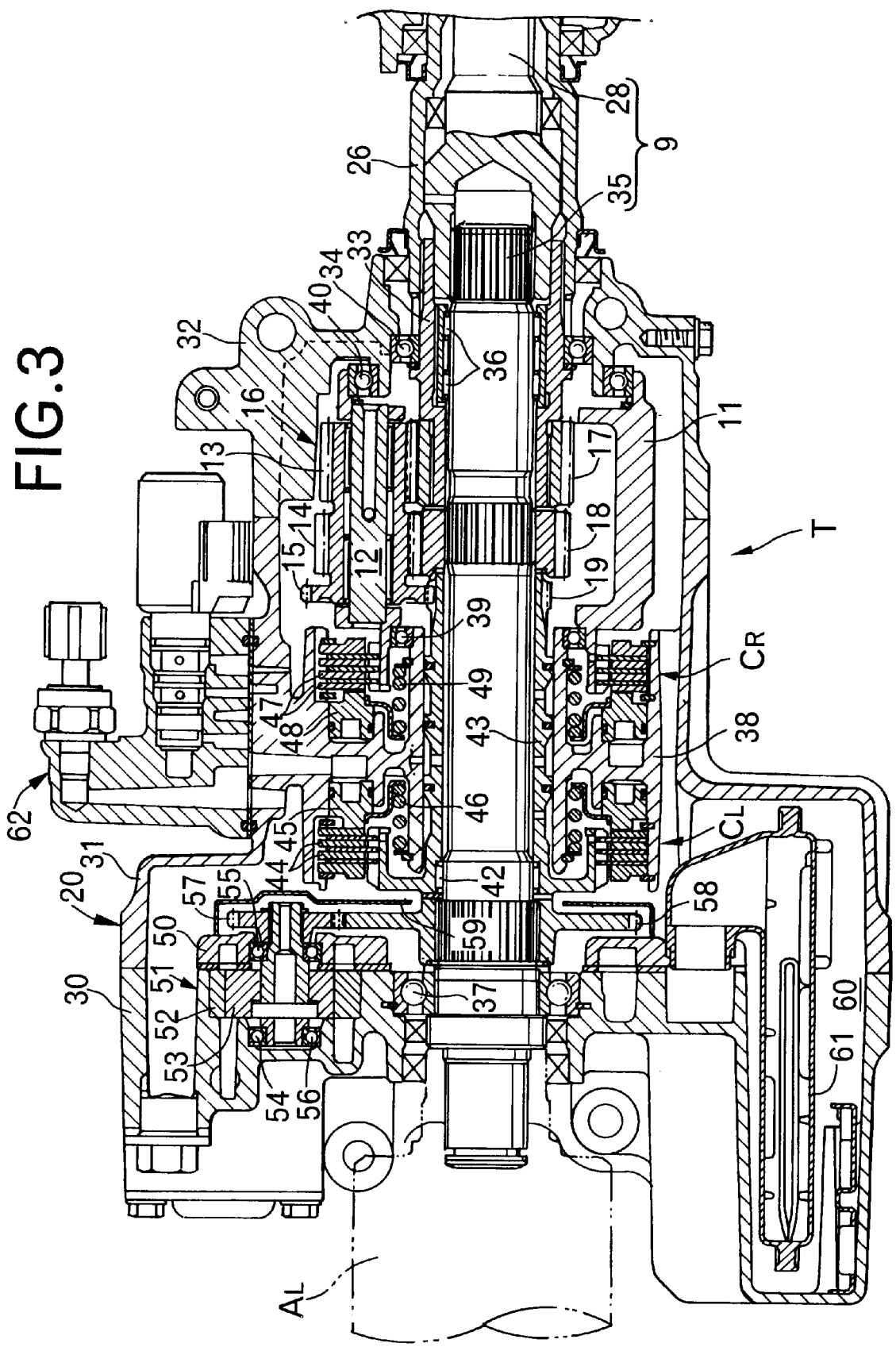
FIG. 3 is a detailed view of a driving force distributing device according to the invention.

The casing 20 of the driving force distributing device T, as illustrated in FIG. 3, is axially divided into three sections: a left casing section 30, a central casing section 31 and a right casing section 32. A second sleeve 33, spline-coupled to a left end of the first sleeve 26, is supported on the right casing section 32 through a ball bearing 34, and a left shaft half 35 of the half shaft 9 is rotatably supported in the second sleeve 33 through needle bearings 36, 36. In the half shaft 9, accommodated within the first and second sleeves 26 and 33 spline-coupled to each other, an outer periphery of a right end of the left shaft half 35 is coaxially fitted and spline-coupled to an inner periphery of a left end of the right shaft half 28. A left end of the left shaft half 35 of the half shaft 9 supported on the left casing section 30 through a ball bearing 37 extends to the outside from the left casing section 30 and is spline-coupled to the left drive shaft $A_L$.

The carrier member 11 is rotatably supported through a pair of ball bearings 39 and 40 on the right casing section 32 and a clutch housing 38 integrally formed in the central casing section 31. The three-throw pinion members 16, each including the first, second and third pinions 13, 14 and 15, are supported on the plurality of pinion shafts 12 mounted on the carrier member 11. The first pinion 13 is meshed with the first sun gear 17 spline-coupled to the outer periphery of the second sleeve 33. The second pinion 14 is meshed with the second sun gear 18 spline-coupled to the left shaft half 35 of the half shaft 9. The third pinion 15 is meshed with the third sun gear 19 integrally formed in the third sleeve 43 which is rotatably supported on the outer periphery of the left shaft half 35 through a needle bearing 42.

The left hydraulic clutch $C_L$ includes a plurality of friction engagement elements 44 disposed between the central casing section 31 and the third sleeve 43, a piston 45 for bringing the friction engagement elements 44 into engagement with one another by a hydraulic pressure, and a return spring 46 for biasing the piston 45 in a disengaging direction. The right hydraulic clutch $C_R$ includes a plurality of friction engagement elements 47 disposed between the central casing section 31 and the carrier member 11, a piston 48 for bringing the friction engagement elements 47 into engagement with one another by a hydraulic pressure, and a return spring 49 for biasing the piston 48 in a disengaging direction.

A hydraulic pump 51 is provided in the left casing section 30 and covered with a pump cover 50. The hydraulic pump 51 is comprised of a trochoidal pump including an outer rotor 52 and an inner rotor 53. A pump shaft 56 is supported in the left casing section 30 and the pump housing 50 through ball bearings 54 and 55, and includes a pump follower gear 57 at an axial end protruding rightwards from the pump cover 50. The pump follower gear 57 is meshed with and driven by a pump driving gear 58 which is spline-coupled to the left shaft half 35 of the half shaft 9.

A gear cover 59, made from a steel plate by pressing, is mounted to a right surface of the pump cover 50 to cover the pump driving gear 58 and the pump follower gear 57. A lower portion of the pump driving gear 58 is immersed in an oil accumulated in a bottom of the casing 20. If oil splashing occurs within the casing 20 due to rotation of the pump driving gear 58, there is a possibility that the level of the oil may widely fluctuate, or the flying or splashing oil may leak through a breather passage . However, the splashing of the oil can be reliably prevented by the mounting of the gear cover 59, thereby eliminating the above problems. Since the gear cover 59 is made from the steel plate by pressing, it is lightweight and inexpensive. Furthermore, the attachment and detachment of the gear cover 59 is fast and easy and it is therefore a simple procedure to change the material and the shape of the gear cover 59.

An oil reservoir 60 is defined in lower portions of the left and central casing sections 30 and 31, and the oil stored in the oil reservoir 60 is pumped by the hydraulic pump 51 through a strainer 61. A valve block 62 is mounted on an upper surface of the central casing section 31 for controlling the engagement/disengagement of the left and right hydraulic clutches $C_L$ and $C_R$ by the oil supplied from the pump 51.

The structure of the hydraulic pressure circuit H will be described below with reference to FIGS. 4 and 5.

The oil pumped by the hydraulic pump 51 from the oil reservoir 60 through an oil passage $L_1$ is primarily regulated in a regulator valve 65 and then supplied to a linear solenoid valve 67 through an oil passage $L_2$ having an oil temperature sensor 66 incorporated therein, where the oil is secondarily regulated. An oil passage $L_3$ extending from the linear solenoid valve 67 is bifurcated in the middle into passage branches which are connected to left and right shift solenoid valves $68_L$ and $68_R$, respectively. The left shift solenoid valves $68_L$ is connected to the left hydraulic clutch $C_L$ through an oil passage $L_4$ having a left hydraulic pressure sensor $69_L$ incorporated therein, and the right shift solenoid valves $68_R$ is connected to the right hydraulic clutch $C_R$ through an oil passage $L_5$ having a right hydraulic pressure sensor $69_R$ incorporated therein. A lubricating oil passage $L_6$ extending from the regulator valve 65 communicates with the outer periphery of the half shaft 9 through the inside of the clutch housing 38.

The oil passages $L_1$ to $L_6$ for transmitting the hydraulic pressure from the hydraulic pump 51 and passages connected to these oil passages are defined in the casing 20 of the driving force distributing device T and the valve block 62 coupled directly to the casing 20.

Figure 4:
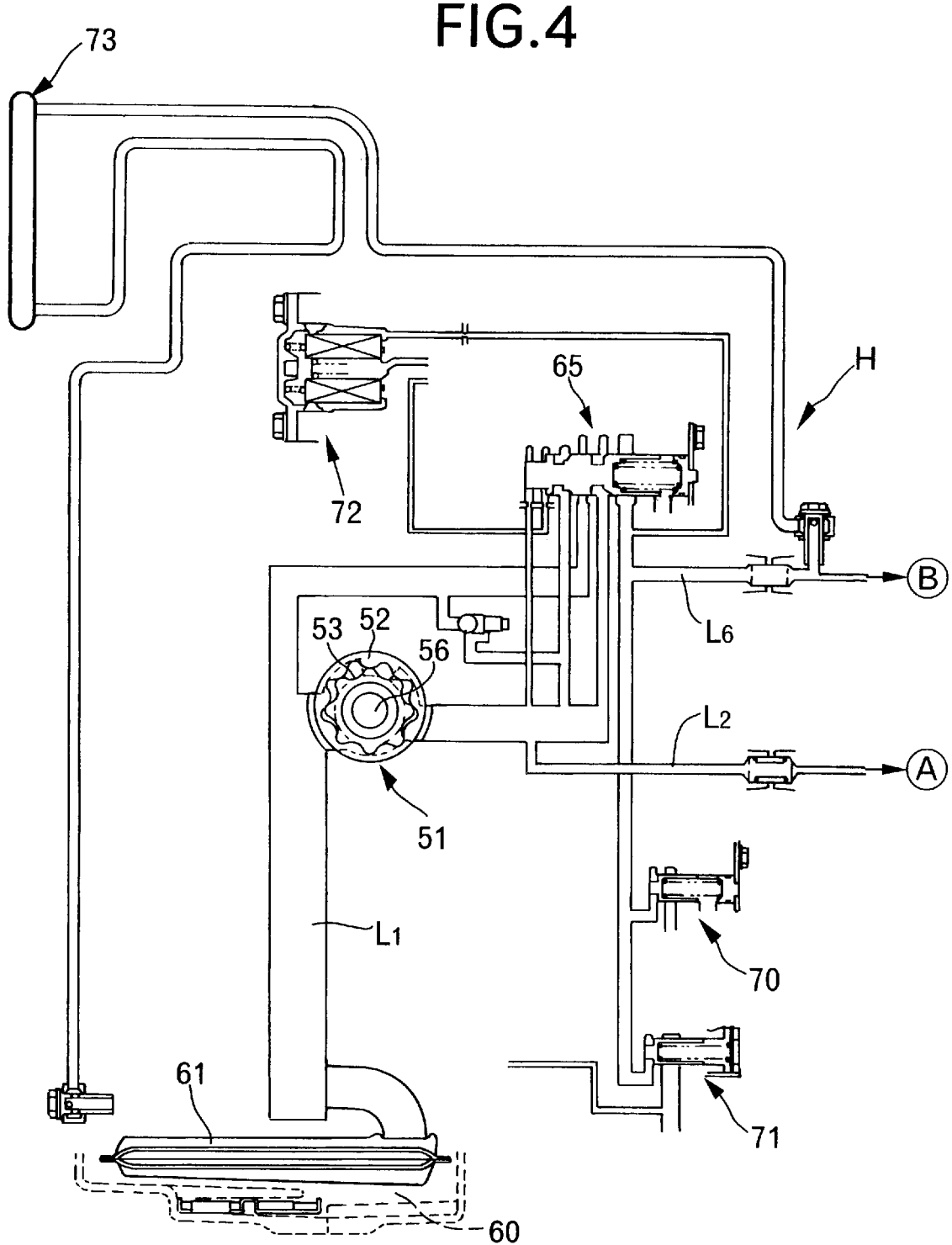
FIG. 4 is a first portion of a hydraulic pressure circuit according to the invention.

In FIG. 4, reference character 70 identifies a cooler relief valve, reference character 71 identifies a lubricating/cooler relief valve, reference character 72 identifies a drain filter, and reference character 73 identifies a radiator built-in cold water cooler.

Figure 5:
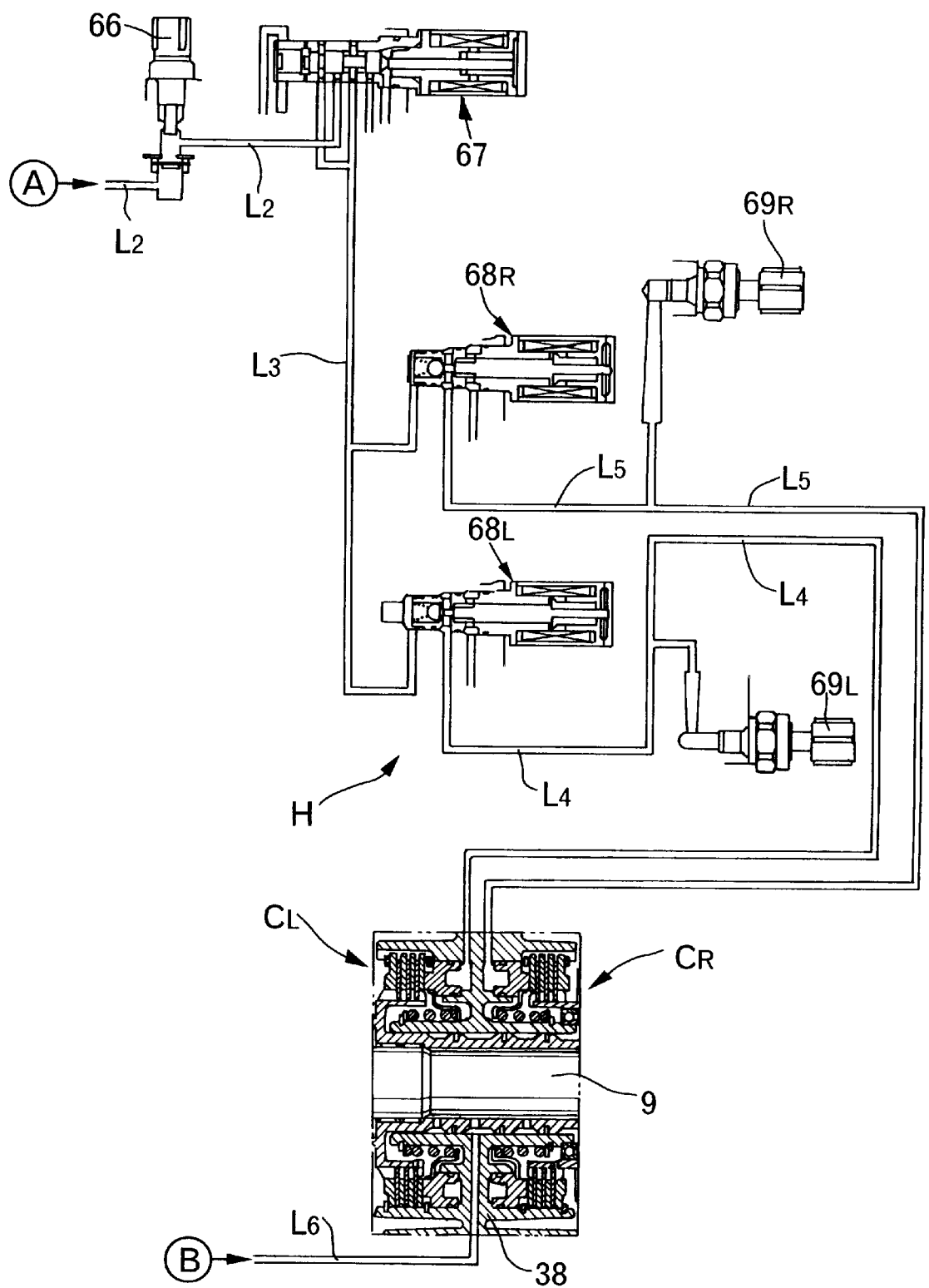
FIG. 5 is a second portion of the hydraulic pressure circuit according to the invention.
Figure 6:
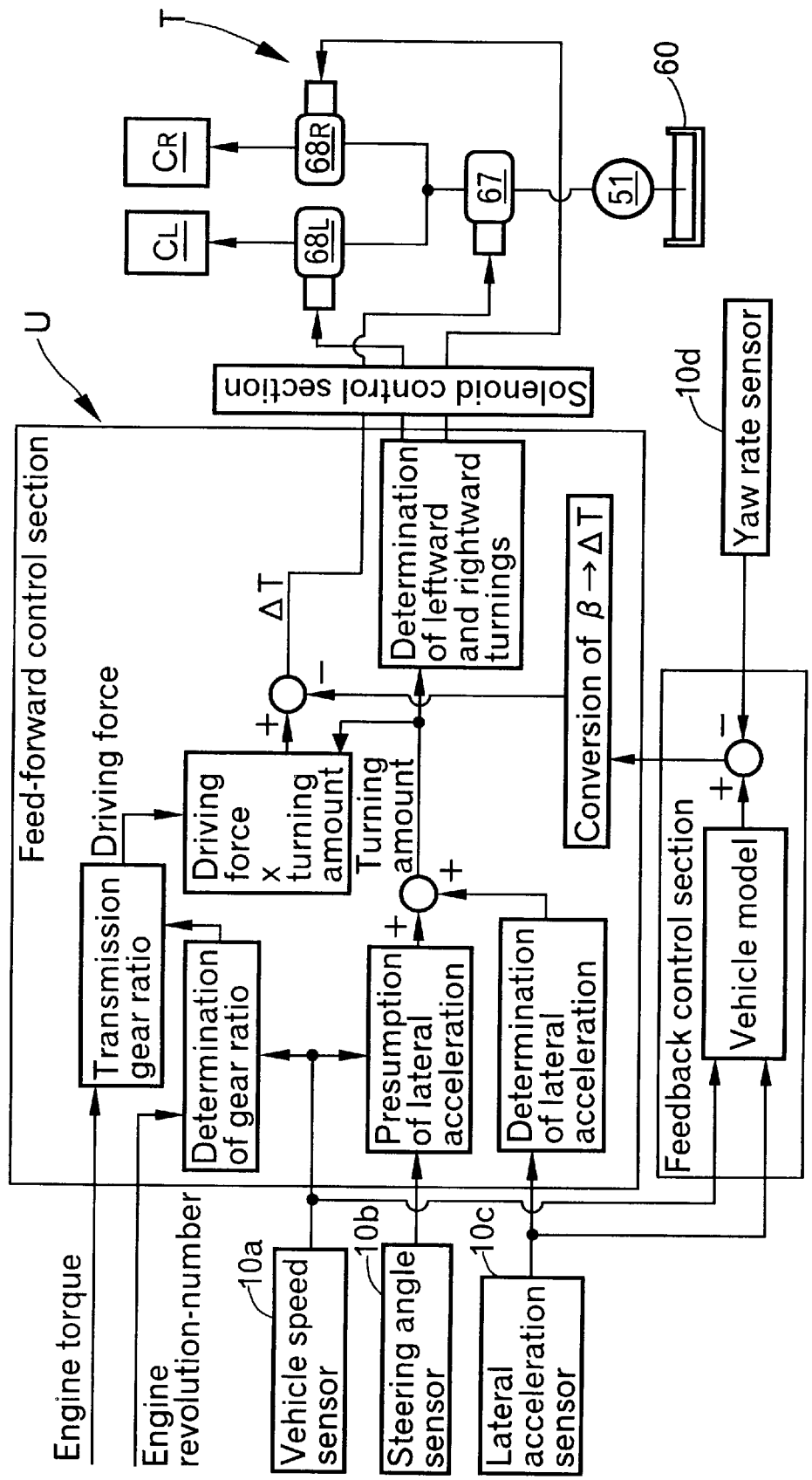
FIG. 6 is a block diagram of a control system of the invention.

As illustrated in FIGS. 4, 5, and 6, the linear solenoid valve 67, the left shift solenoid valve $68_L$, and the right shift solenoid valve $68_R$ are connected to and controlled by the electronic control unit U. The linear solenoid valve 67 secondarily regulates the hydraulic pressure primarily regulated in the regulator valve 65 to regulate the engagement forces of the left and right hydraulic clutches $C_L$ and $C_R$ to any value. The left shift solenoid valve $68_L$ is controlled between ON and OFF positions to open and close the oil passage $L_4$ and to control the engagement/disengagement of the left hydraulic clutch $C_L$. The right shift solenoid valve $68_R$ is controlled between ON and OFF positions to open and close the oil passage $L_5$ and to control the engagement/disengagement of the right hydraulic clutch $C_R$.

Since the hydraulic pump 51 is disposed within the casing 20 of the driving force distributing device T, as described above, the oil passages $L_1$ to $L_6$ extending from the hydraulic pump 51 and connected to the left and right hydraulic clutches $C_L$ and $C_R$ and the accompanying oil passages can be defined in the casing 20 and the valve block 62 coupled directly to the casing 20. Therefore, it is possible to suppress the length of each of the oil passages to the minimum and moreover to eliminate the need for a pipe extending to the outside of the casing 20. If the hydraulic pump 51 is mounted in the engine E or the transmission M, not only the lengths of the oil passages are increased, but also it is necessary to place a pipe outside the casing. Furthermore, it is difficult to cope with a case where the type of oil used in the driving force distributing device T and the type of oil used in the engine E or the transmission M differs from each other. In addition, the oil pump 51 is driven by the half shaft 9 connected to one of the wheels (the left front wheel $W_{FL}$ in the embodiment) and, therefore, the driving system for transmitting the driving force to the hydraulic pump 51 can be simplified.

The operation of the embodiment of the present invention having the above-described arrangement will be described below.

Referring to FIG. 6, the electronic control unit U includes a feed-forward control section and a feedback control section. In addition to signals from the vehicle speed sensor 10a, the steering angle sensor 10b, and the lateral acceleration sensor 10c, an engine torque and an engine revolution-number are inputted to the feed-forward control section, and signals from the vehicle speed sensor 10a, the lateral acceleration sensor 10c, and the yaw rate sensor 10d are inputted to the feedback control section.

The feed-forward control section determines a lateral acceleration based on an output from the lateral acceleration sensor 10c and presumes a lateral acceleration based on an output from the vehicle speed sensor 10a and an output from the steering angle sensor 10b, whereby a turned amount of the vehicle is calculated based on the two lateral accelerations. The presumed lateral acceleration is risen faster than the lateral acceleration determined based on the output from the lateral acceleration sensor 10c. On the other hand, a gear ratio is determined based on the output from the vehicle speed sensor 10a and the engine revolution-number, and a driving force for the vehicle is calculated based on the gear ratio and the engine torque.

The driving force distributing device determines a driving force distribution amount $\Delta T$ to be distributed to the left and right front wheels $W_{FL}$ and $W_{FR}$, based on a product of the driving force and the turned amount. The quantity of electric current supplied to the linear solenoid 67 is controlled, so that a hydraulic pressure required to provide such driving force distribution amount $\Delta T$ is outputted to the left or right hydraulic clutch $C_L$ and the $C_R$. A turning direction is determined based on the turned amount. During leftward turning of the vehicle, an electric current is supplied to the left shift solenoid valve $68_L$ in order to bring the left hydraulic clutch $C_L$ into its engaged state, and during rightward turning of the vehicle, an electric current is supplied to the right shift solenoid valve $68_R$ in order to bring the right hydraulic clutch $C_R$ into its engaged state.

Figure 9A:
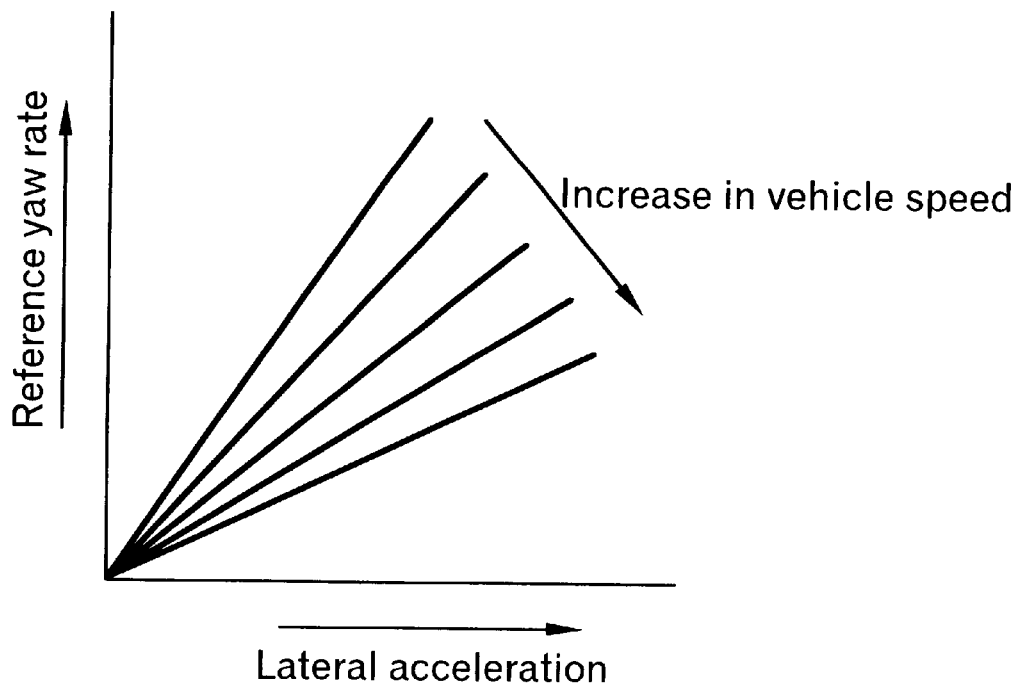
FIG. 9 is a graph illustrating a reference yaw rate determining method according to the invention.

The feedback control section calculates a reference yaw rate from a vehicle model shown in FIG. 9A, based on the output from the vehicle speed sensor 10a and the output from the lateral acceleration sensor 10c. Then, a deviation β between an actual yaw rate detected by the yaw rate sensor 10d and the reference yaw rate is calculated. The deviation β is inputted to the feed-forward control section, where it is converted into a driving force distribution amount ΔT. This driving force distribution amount ΔT is subtracted from the driving force distribution amount ΔT calculated in the feed-forward control section to achieve a correction. Specifically, when the driving force distribution amount ΔT becomes excessive to generate an over-steering tendency in the vehicle, the driving force distribution amount ΔT is corrected to a decreased value to eliminate the over-steering tendency. The driving force distribution amount ΔT distributed to the left and right front wheels $W_{FL}$ and $W_{FR}$ by the driving force distributing device T is controlled by both of a feed-forward control and a feedback control.

In this manner, a driving force distribution amount required to generate an appropriate yaw moment in the vehicle is presumed based on the vehicle speed, the steering angle, the lateral acceleration and the like, and the left and right hydraulic clutches $C_L$ and $C_R$ are controlled so that such driving force distribution amount is obtained. Therefore, it is possible to achieve a control with a high responsiveness. When an over-steering tendency has been generated in the vehicle, the over-steering tendency can be eliminated to stabilize the behavior of the vehicle, by the feedback control which converges the deviation between the actual yaw rate and the reference yaw rate into zero with a high accuracy.

Figure 7:
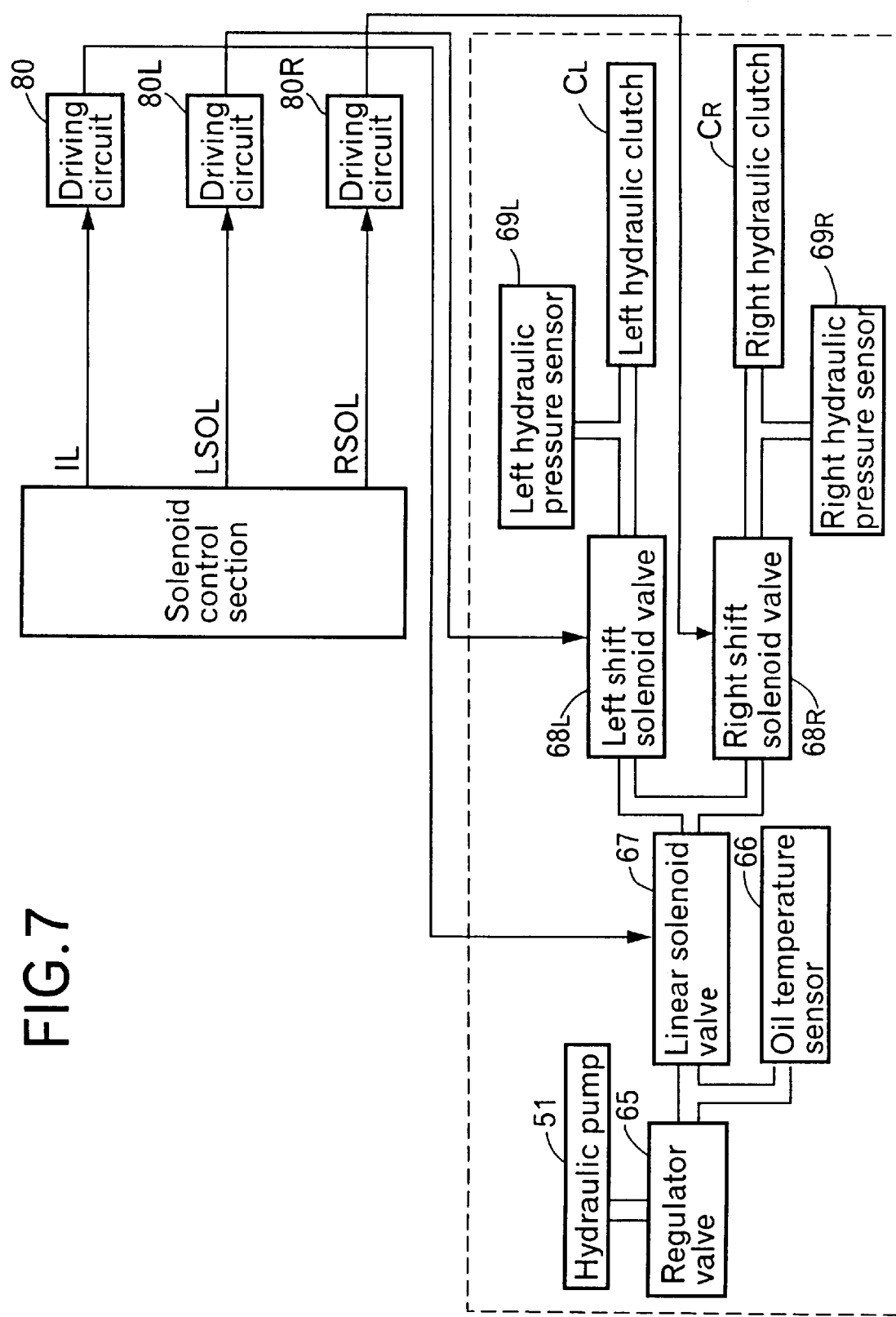
FIG. 7 is a block diagram of a hydraulic pressure control system of the invention.

As illustrated in FIG. 7, the hydraulic circuit H interconnecting the hydraulic pump 51 and the left and right hydraulic clutches $C_L$ and $C_R$ includes the following components:

regulator valve 65 for limiting a working oil discharged by the hydraulic pump 51 to a given pressure;

linear solenoid valve 67 as a pressure regulating means for regulating the pressure of the working oil passed through the regulator valve 65;

oil temperature sensor 66 for detecting the temperature of the working oil passed through the linear solenoid valve 67;

right shift solenoid valve $68_R$ mounted between the linear solenoid valve 67 and the right hydraulic clutch $C_R$;

left shift solenoid valve $68_L$ mounted between the linear solenoid valve 67 and the left hydraulic clutch $C_L$;

right hydraulic pressure sensor $69_R$ for detecting a hydraulic pressure transmitted to the right hydraulic clutch $C_R$; and left hydraulic pressure sensor $69_L$ for detecting a hydraulic pressure transmitted to the left hydraulic clutch $C_L$.

A solenoid control section of the electronic control unit U controls the opening degree of the linear solenoid valve 67 by outputting an electric current corresponding to an operation amount IL to a driving circuit 80. The solenoid control section also controls the opening and closing of the left and right shift solenoid valves $68_L$ and $68_R$ by outputting shift solenoid valve driving commands LSOL and RSOL to drive circuits $81_L$ and $81_R$.

Figure 8:
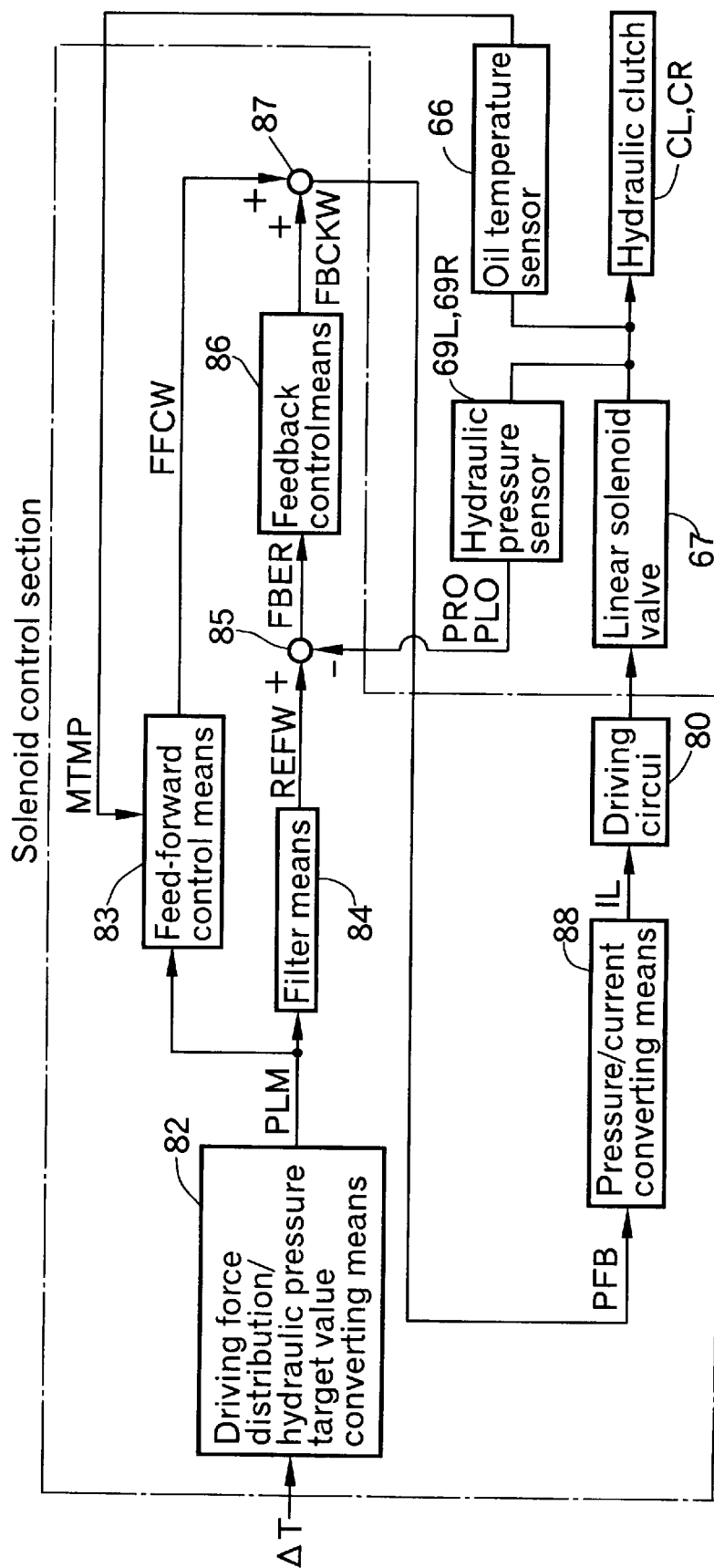
FIG. 8 is a block diagram of a solenoid control system of the invention.

As shown in FIG. 8, the solenoid control section includes:

driving force distribution amount/hydraulic pressure target value converting means 82 for converting the driving force distribution amount ΔT into a hydraulic pressure target value PLM;

feed-forward control means 83 for calculating a feed-forward term FFCW (a first operation amount) based on the hydraulic target value PLM and an oil temperature MTMP detected by the oil temperature sensor 66;

filter means 84 comprised of a low-pass filter for removing a high-frequency component from the hydraulic pressure target value PLM;

subtracting means 85 for calculating a control deviation FBER which is deviation between a filter value REFW of the hydraulic pressure target value PLM and the hydraulic pressure PLO, PRO detected by the hydraulic sensor $69_L$, $69_R$;

feedback control means 86 for calculating a feedback term FBCKW (a second operation amount) based on the control deviation FBER;

adding means 87 for adding the feed-forward term FFCW and the feedback term FBCKW to calculate an operation amount PFB;

pressure/current converting means 88 for converting the operation amount PFB into an electric current value to calculate an operation amount IL; and driving circuit 80.

Figure 10:
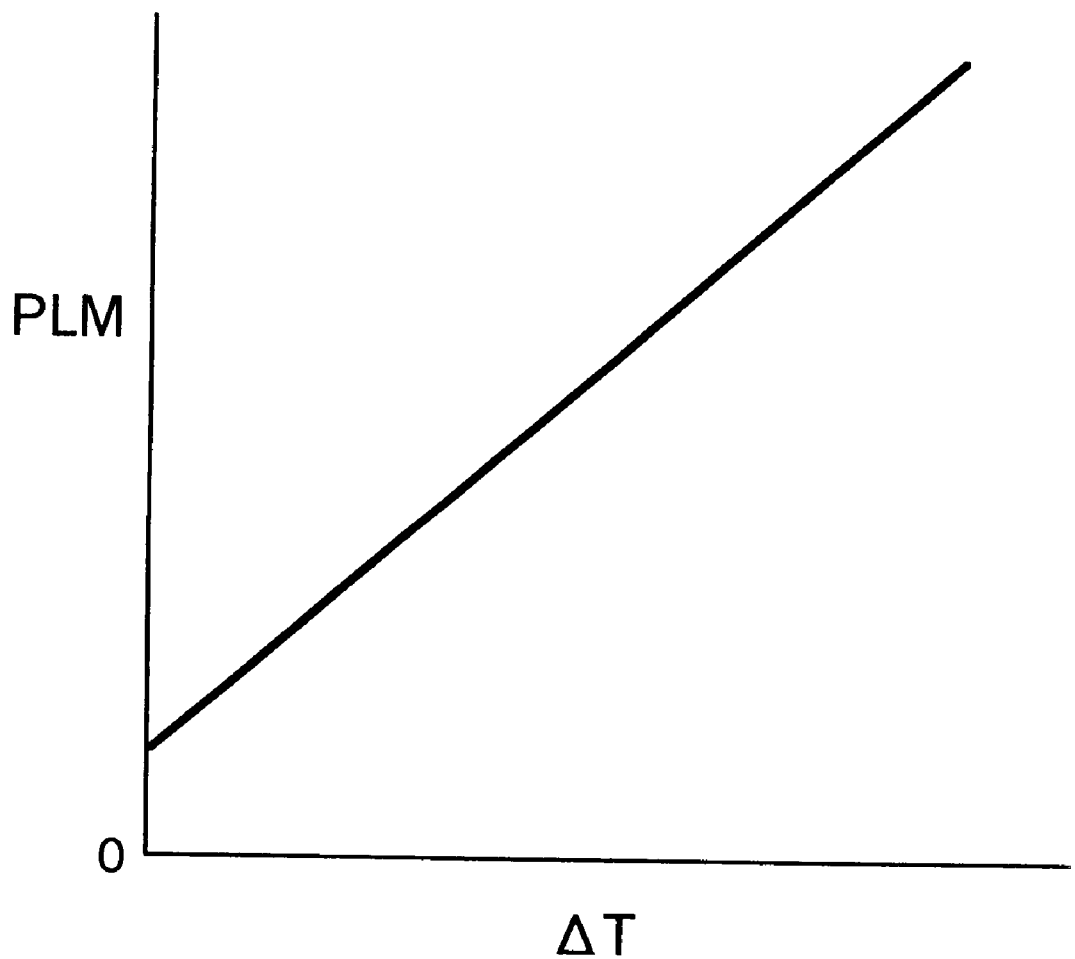
FIG. 10 is a graph illustrating the relationship between the driving force distribution amount $\Delta T$ and the hydraulic pressure target value PLM.

The driving force distribution amount/hydraulic pressure target value converting means 82 converts the driving force distribution amount ΔT into the hydraulic pressure target value PLM based on a map shown in FIG. 10.

Figure 11:
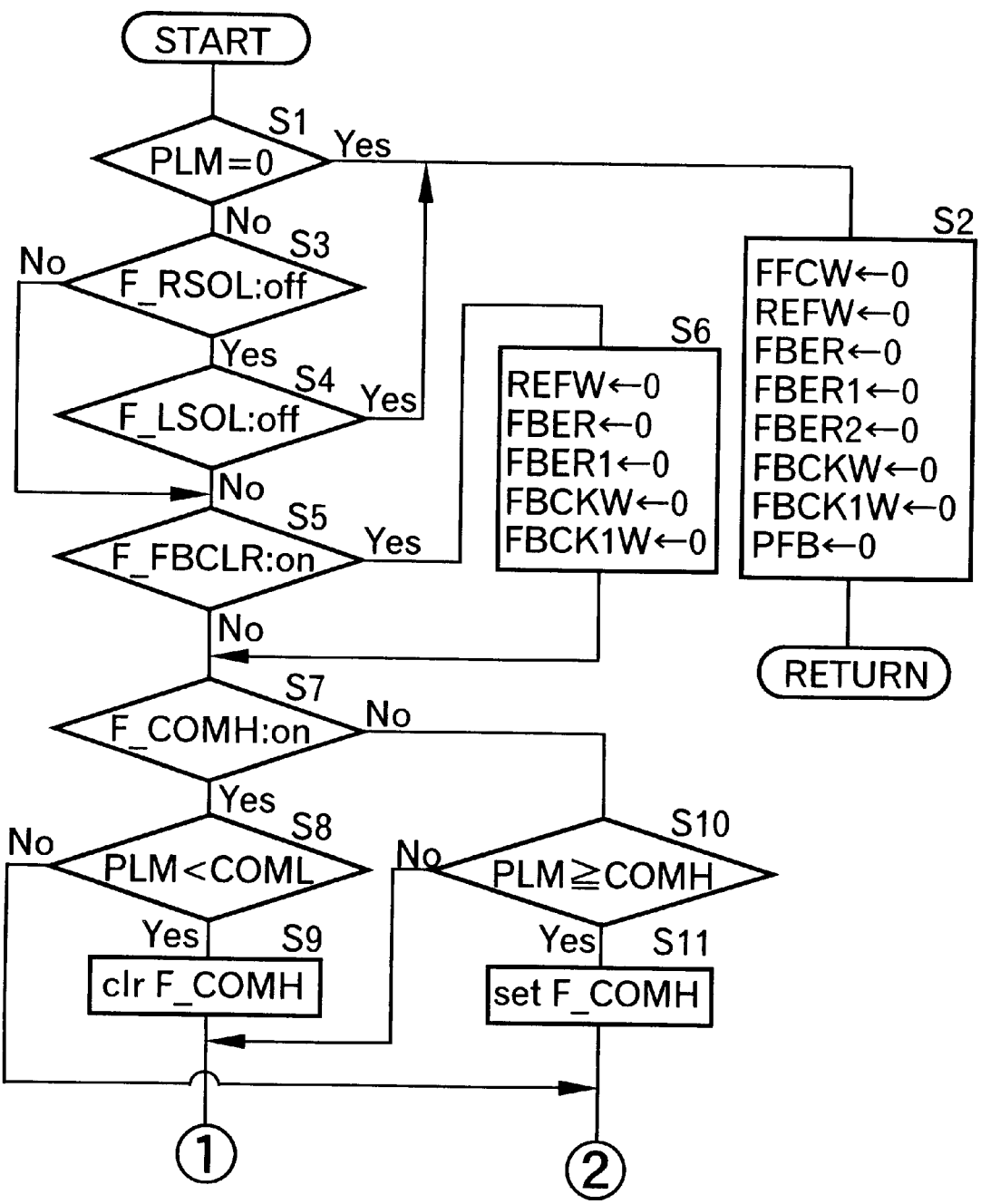
FIG. 11 is a first portion of a flow chart illustrating the operation of the invention.
Figure 12:
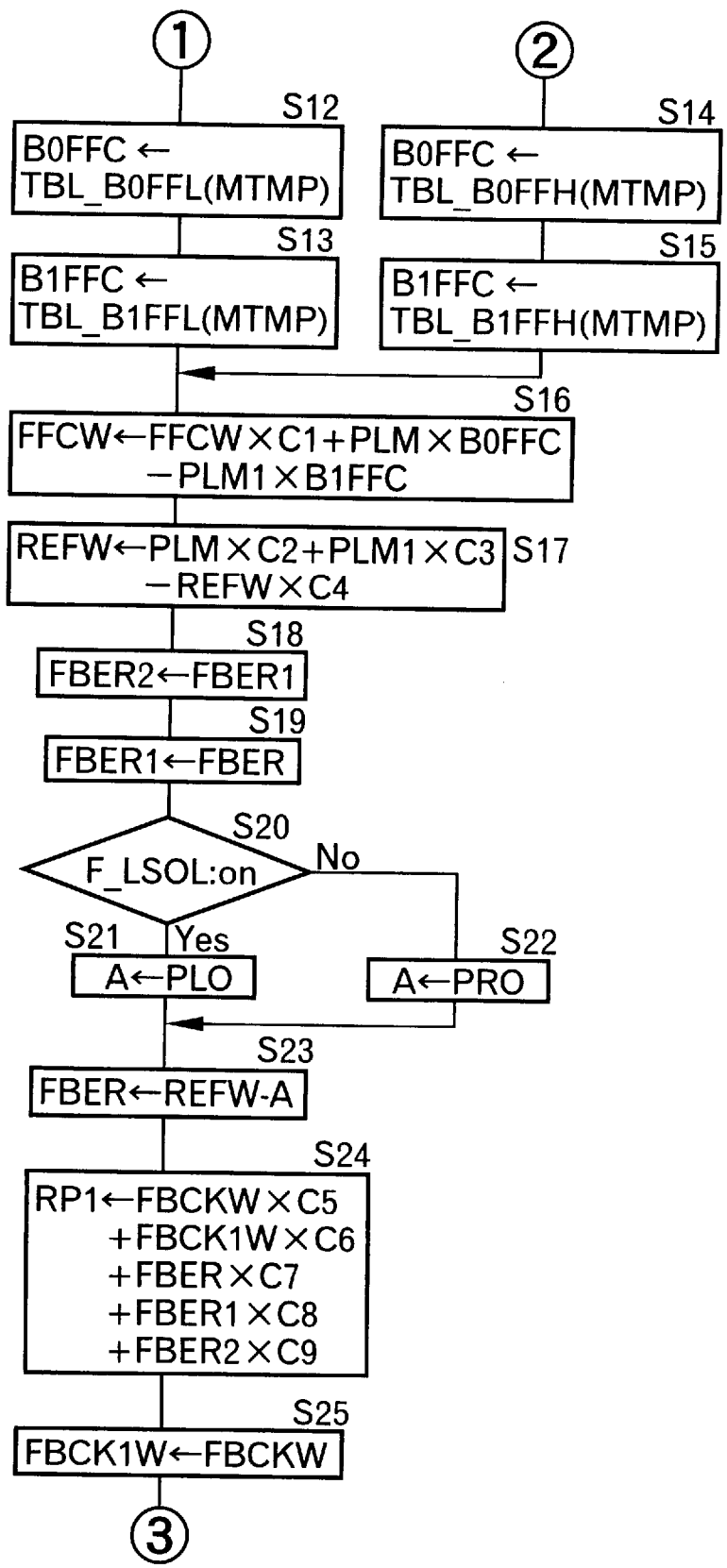
FIG. 12 is a second portion of the flow chart of FIG. 11.
Figure 13:
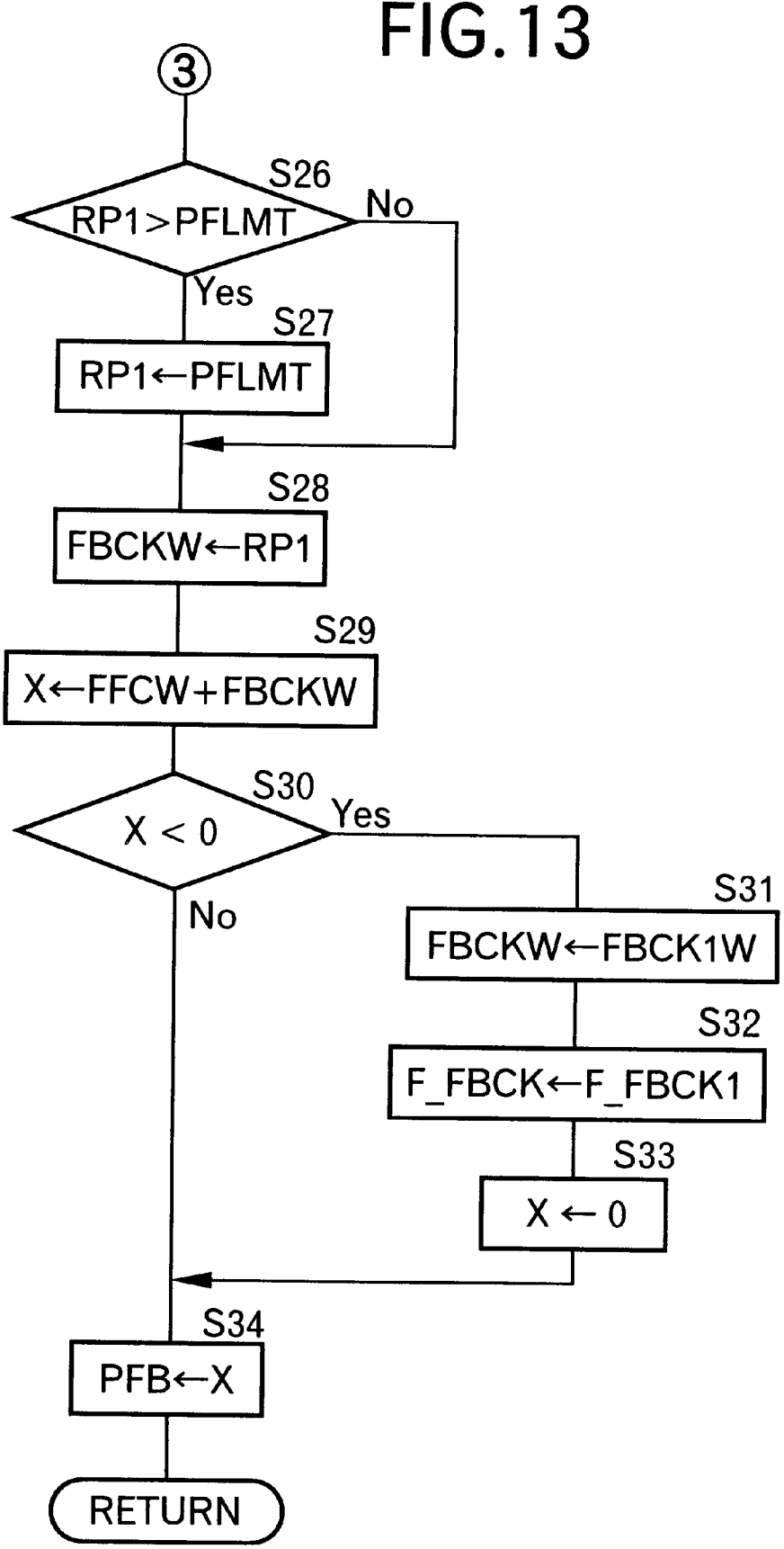
FIG. 13 is a third portion of the flow chart of FIGS. 11 and 12.

The solenoid control section outputs the operation amount IL to the driving circuit 80 of the linear solenoid valve 67 to generate the driving force distribution amount ΔT in the driving force distributing device T. The operation of the solenoid control section will be further described with reference to the flow charts shown in FIGS. 11 to 13.

First, if the hydraulic pressure target value PLM to be outputted from the linear solenoid valve 67 is 0 at step S1, all constants shown below are set at an initial value of 0 at step S2:

FFCW feed-forward term

REFW: filter value of hydraulic pressure target value

FBER: control deviation

FBER1:last value of control deviation

FBER2:last but one value of control deviation

FBCKW:feedback term

FBCK1W:last value of feedback term

PFB:hydraulic operation amount

If the hydraulic pressure target value PLM is not 0 at step S1, and both of the right shift solenoid valve operation determining flag F_RSOL and the left shift solenoid valve operation determining flag F_LSOL are OFF at steps S3 and S4, i.e., both of the left and right shift solenoid valves $68_L$ and $68_R$ are in their closed states, the processing is shifted to step S2, at which all the constants are set at the initial value of 0. If either one of the right shift solenoid valve operation determining flag F_RSOL and the left shift solenoid valve operation determining flag F_LSOL is ON, i.e., either one the left and right shift solenoid valves $68_L$ and $68_R$ is in its opened state, the processing is advanced to step S5. If a shift solenoid valve switch-over flag F_FBCLR is ON at step S5 to indicate that the shift solenoid valve opening command has been switched over from the side of the right shift solenoid valve $68_R$ to the side of the left shift solenoid valve $68_L$, or from the side of the left shift solenoid valve $68_L$ to the side of the right shift solenoid valve $68_R$, the five constants REFW (filter value of hydraulic target value), FBER (control deviation), FBER1 (last value of control deviation), FBCKW (feedback term), and FBCK1 (last value of feedback term) are set at the initial value of 0 at step S6.

At subsequent steps S7 to S15, a first feed-forward term calculating factor B0FFC and a second feed-forward term calculating factor B1FFC for calculating the feed-forward term FFCW are determined based on the hydraulic pressure target value PLM and the oil temperature MTMP by the feed-forward control means 83.

Figure 14:
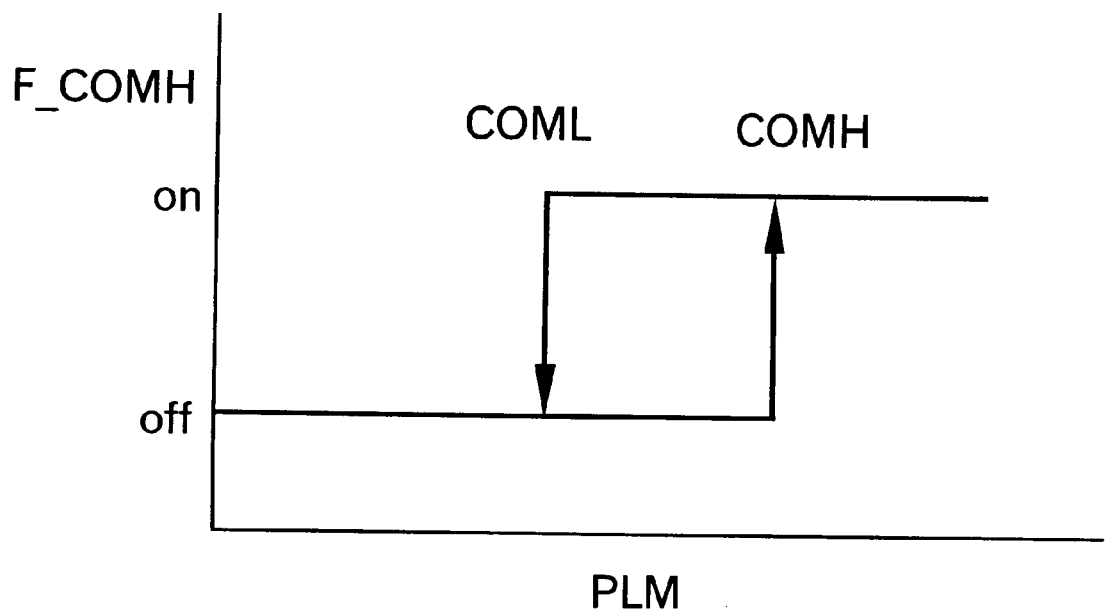
FIG. 14 is a table for determining a hydraulic pressure increasing/decreasing flag F_COMH from a hydraulic pressure target value PLM according to the invention.

As shown in FIG. 14, a hydraulic pressure increasing/decreasing flag F_COMH is provided in order to ensure that each of the feed-forward term calculating factors B0FFC and B1FFC has a hysteresis between increasing of the hydraulic pressure target value PLM and decreasing of the hydraulic pressure target value PLM. During increasing of the hydraulic pressure target value PLM, the hydraulic pressure increasing/decreasing flag F_COMH remains OFF, until the hydraulic pressure target value PLM reaches a larger reference value COMH, and when the hydraulic pressure target value PLM has become equal to or larger than the larger reference value COMH, the hydraulic pressure increasing/decreasing flag F_COMH is turned ON. In addition, during decreasing of the hydraulic pressure target value PLM, the hydraulic pressure increasing/decreasing flag F_COMH remains ON, until the hydraulic pressure target value PLM reaches a smaller reference value COML, and when the hydraulic pressure target value PLM has become smaller than the smaller reference value COML, the hydraulic pressure increasing/decreasing flag F_COMH is turned OFF.

When the hydraulic pressure target value PLM has been gradually decreased to become smaller than the smaller reference value COML, namely, when the answer at step S7 is YES and the answer at step S8 is YES, the hydraulic pressure increasing/decreasing flag F_COMH is cleared from ON to OFF at step S9. Further, at step S12, TBL_B0FFL searched from a table shown in FIG. 15A is employed as the first feed-forward term calculating factor B0FFC, and at step S13, TBL_B1FFL searched from a table shown in FIG. 15B is employed as the second feed-forward term calculating factor B1FFC.

When the hydraulic pressure target value PLM has been gradually increased to become equal to or larger than the smaller reference value COMH, namely, when the answer at step S7 is NO and the answer at step S10 is YES, the hydraulic pressure increasing/decreasing flag F_COMH is set from OFF to ON at step S11. Further, at step S14, TBL_B0FFH searched from the table shown in FIG. 15A is employed as the first feed-forward term calculating factor B0FFC, and at step S15, TBL_B1FFH searched from the table shown in FIG. 15B is employed as the second feed-forward term calculating factor B1FFC.

Figure 15A:
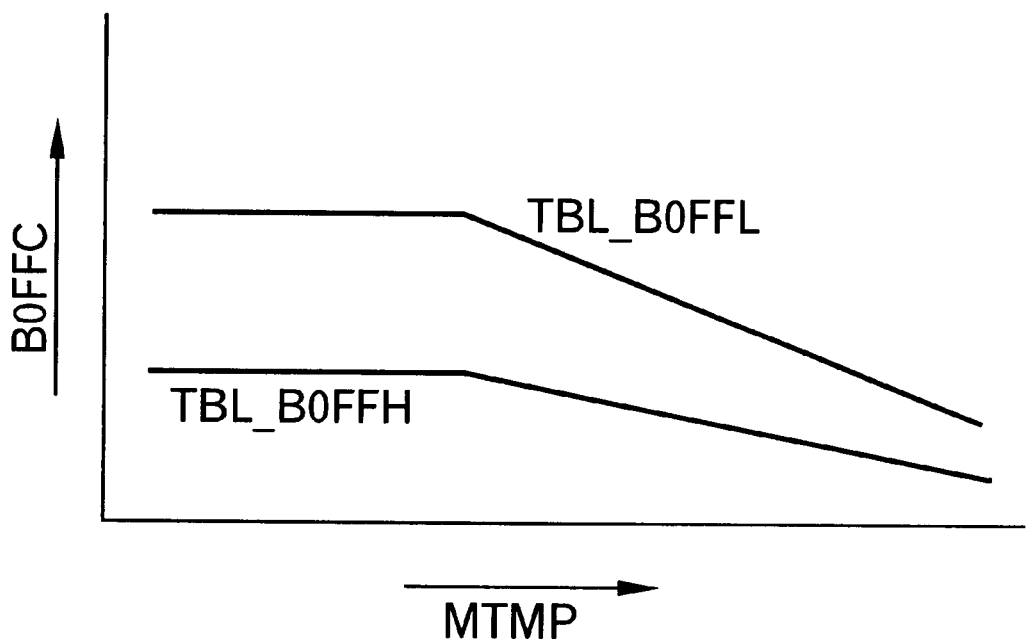
FIG. 15 is a table for determining feed-forward term calculating factors B0FFC and B1FFC from an oil temperature WTMP.
Figure 15B:
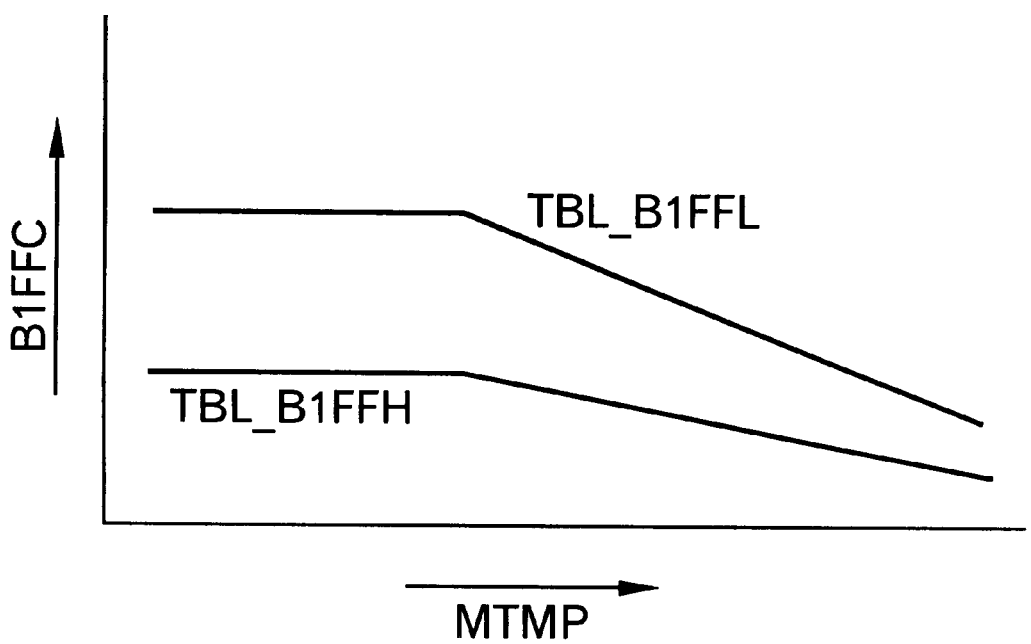

The characteristic of the first feed-forward term calculating factor B0FFC shown in FIG. 15A and the characteristic of the second feed-forward term calculating factor B1 FFC shown in FIG. 15B are similar to each other, but set such that the value of he first feed-forward term calculating factor B0FFC is slightly larger than the second feed-forward term calculating factor B1FFC.

If the answers at steps S7, S8 and S10 are other than the above-described answers, the last values of the first and second feed-forward term calculating factors B0FFC and B1FFC are employed, as they are, as the current values at steps S12 to S15, without setting or clearing of the hydraulic pressure increasing/decreasing flag F_COMH at steps S9 and S11.

When the first and second feed-forward term calculating factors B0FFC and B1FFC have been searched from the tables in the above manner, a feed-forward term FFCW as the first operation amount is calculated at step S16 according to the following equation using the feed-forward term FFCW, the hydraulic pressure target value PLM, the first feed-forward term calculating factor B0FFC, the last value PLM1 of the hydraulic pressure target value PLM, the second feed-forward term calculating factor B1FFC and the constant C1:

$$FFCW \leftarrow FFCW \times C1 + PLM \times B0FFC - RLM1 \times B1FFC \tag{1}$$

Then, a filter value REFW provided by permitting the hydraulic pressure target value PLM to be passed through the filter means 54 is calculated at step S17 according to the following equation using the hydraulic pressure target value PLM, the last value PLM1 of the hydraulic pressure target value PLM, the filter value REFW and the constants C2, C3 and C4:

$$REFW \leftarrow PLM \times C2 + PLM1 \times C3 - REFW \times C4 \tag{2}$$

Then, the last but one value FBER2 of the control deviation is renewed by the last value FBER1 at step S18, and the last value FBER1 of the control deviation is renewed by the current value FBER at step S19. If the left shift solenoid valve operation determining flag F_LSOL is on, and the left shift solenoid valve $68_L$ is in its opened state at step S20, the hydraulic pressure PLO detected by the left hydraulic pressure sensor $69_L$ is defined as a hydraulic pressure detection value A at step S21. In addition, if the right shift solenoid valve operation determining flag F_RSOL is off, and the right shift solenoid valve $68_R$ is in its opened state at step S20, the hydraulic pressure PRO detected by the right hydraulic pressure sensor $69_R$ is defined as the hydraulic pressure detection value A at step S22. A control deviation FBER is calculated at step S23 according to the following equation using the filter value REFW of the hydraulic pressure target value PLM and the hydraulic pressure detection value A:

$$FBER \leftarrow REFW - A \tag{3}$$

A register value RP1 of the feedback term stored in a general-purpose register by the feedback control means 86 is calculated at step S24 according to the following equation using the feedback term FBCKW, the last value FBCK1W of the feedback term, the control deviation FBER, the last value FBER1 of the control deviation, the last but one value FBER2 of the control deviation and the constants C4 to C9:

$$RP1 \leftarrow FBCKW \times C5 + FBCK1W \times C6 + FBER \times C7 + FBER1 \times C8 + FBER2 \times C9 \tag{4}$$

Then, the last value FBCK1W of the feedback term is renewed by the current value FBCKW at step S25 and then, an upper limit process for a register value RP1 of the feedback term is carried out at steps S25 and S26. Specifically, if the register value RP1 of the feedback term exceeds an upper limit value PFLMT, this upper limit value PFLMT is determined as the register value RP1 of the feedback term. Then, at step S28, the register value RP1 of the feedback term provided after the upper limit process is determined as a final feedback term FBCKW serving as the second operation amount.

Subsequently, at step S29, a value resulting from the addition of the feed-forward term FFCW calculated according to the equation (1) and the feedback term FBCKW calculated according to the equation (4) is determined as a register value X of the operation amount. If the register value X of the operation amount is negative at step S30, the feedback term FBCKW is replaced by the last value FBCK1W at step S31, and the feedback flag F_FBCK is replaced by the last value F_FBCK1 at step S32, thereby invalidating the current renewing. Further, at step S33, the register value X of the operation amount is set at 0.

If the register value X of the control amount is not negative at step S30, such register value X is determined, as it is, as a hydraulic operation amount PFB at step S34. In this case, if the register value X is negative at step S30, the hydraulic operation amount PFB is 0. If the hydraulic operation amount PFB is determined in this manner, the solenoid control section outputs the operation amount IL converted into the electric current by the pressure/current converting means 88 to the driving circuit 80 to control the opening degree of the linear solenoid valve 67.

When the right or left solenoid valve $68_R$ or $68_L$ is opened, a time lag is produced until the working oil is filled into the oil passage interconnecting the linear solenoid valve 67 and the right hydraulic clutch $C_R$ or into the oil passage interconnecting the linear solenoid valve 67 and the left hydraulic clutch $C_L$ to rise the hydraulic pressure. If the viscosity of the working oil is increased with the lowering of the oil temperature, this time lag is remarkable. In this embodiment, however, the time lag can be effectively eliminated by the use of the feed-forward control in addition to the feedback control.

Figure 16A:
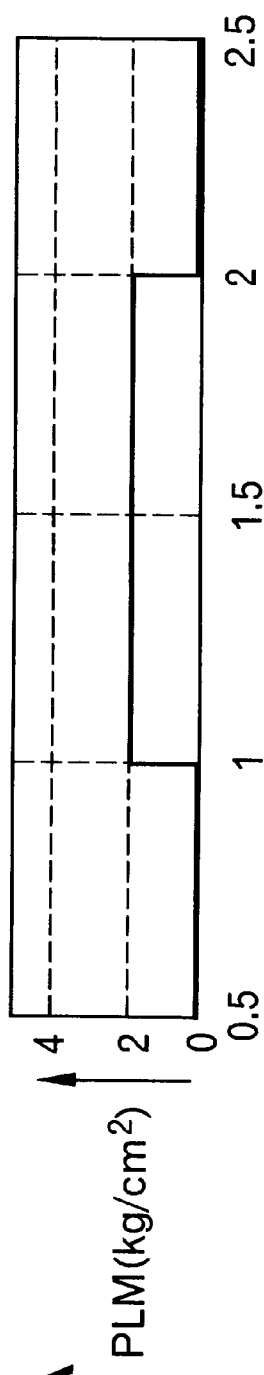
FIG. 16 is a time chart for explaining the operation of the invention.
Figure 16B:
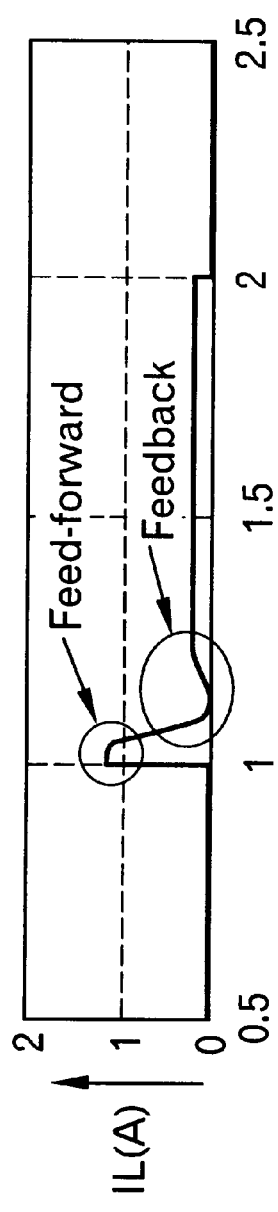
Figure 16C:
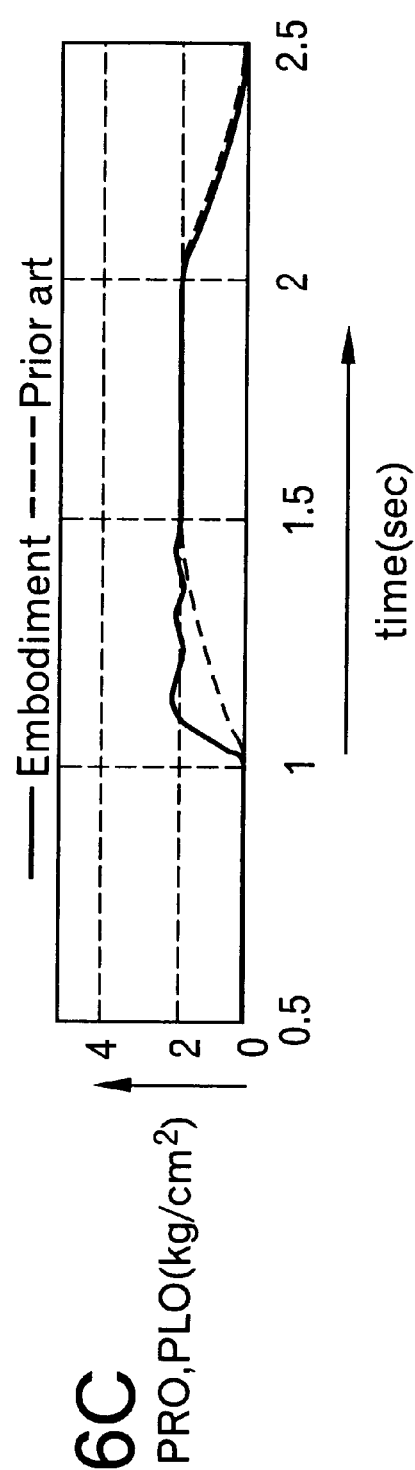

If the hydraulic pressure target value PLM is increased stepwise (see FIG. 16A), the operation amount IL which is an electric current value outputted to the linear solenoid valve 67 is risen quickly (see FIG. 16B) and hence, the hydraulic pressure PRO, PLO outputted by the linear solenoid valve 67 is risen quickly (see FIG. 16C), thereby effectively eliminating a reduction in responsiveness of the engagement of the left and right hydraulic clutches $C_L$ and $C_R$ due to the lowering of the oil temperature. Moreover, the risen hydraulic pressure PRO, PLO is converged quickly into the hydraulic pressure target value PLM without significantly over-shooting the hydraulic pressure target value PLM.

Figure 17:
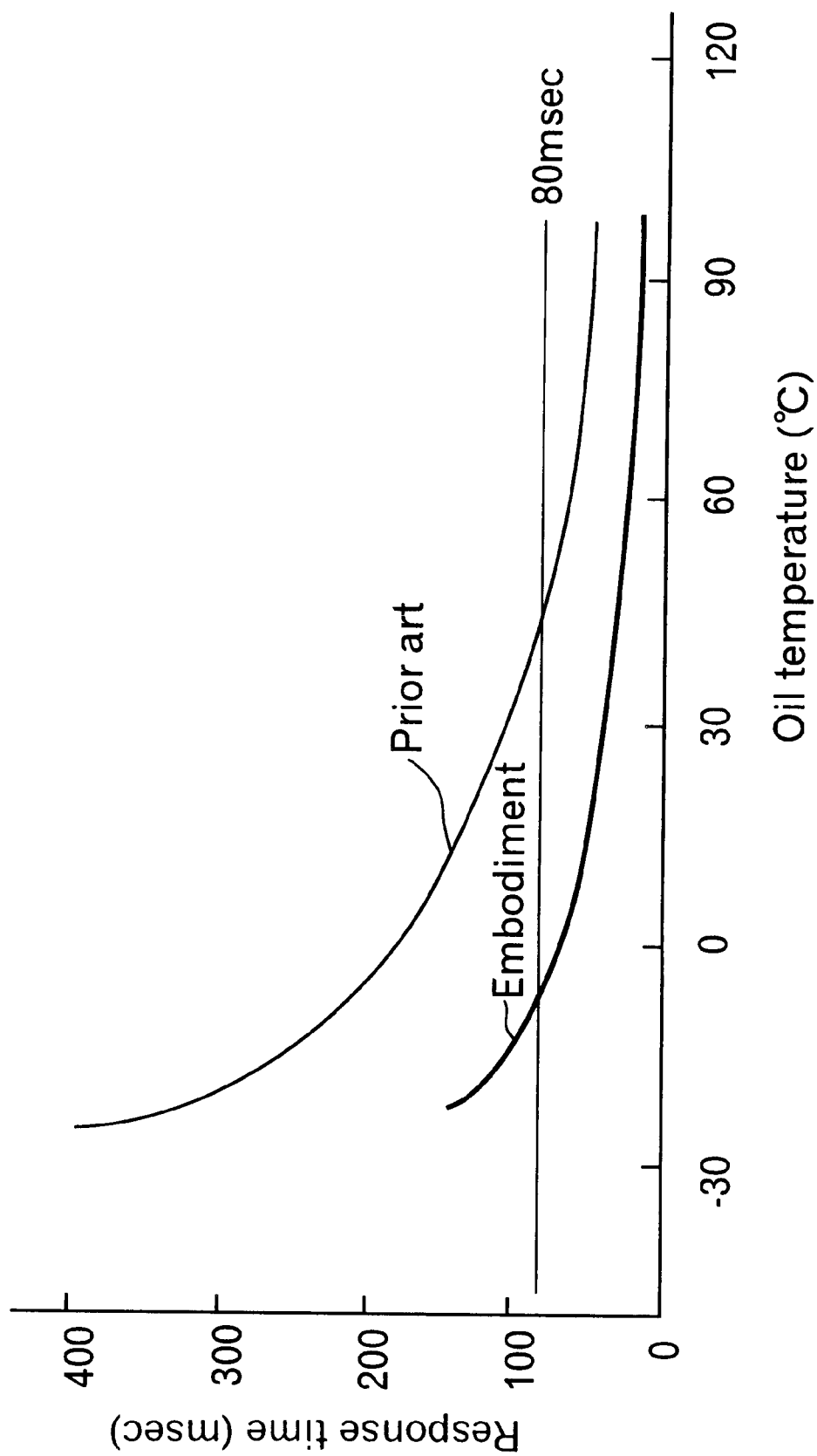
FIG. 17 is a graph for explaining an effect of the invention.

FIG. 17 shows the responsiveness of the hydraulic pressure PRO, PLO outputted by the linear solenoid valve 67, wherein the axis of abscissa is the oil temperature MTMP, and the axis of ordinate is a response time until the hydraulic pressure PRO, PLO reaches 63.2% of the hydraulic target value PLM. As apparent from this graph, in the prior art in which only the feedback control is carried out, when the oil temperature MTMO is equal to or lower than 45° C., the response time exceeds 80 msec; 80 msec is considered to be an acceptable value, but above 80 msec is considered excessive. However, according to the present invention in which both of the feedback control and the feed-forward control are used, it is possible to ensure response time within 80 msec until the oil temperature MTMO becomes −10° C. or lower.

Therefore, according to the present invention, it is possible to eliminate the reduction in responsiveness of operation of the hydraulic actuator due to the lowering of the oil temperature only by modifying the control software.

The operation of the driving force distributing device T is as follows:

When the vehicle is traveling straight, both of the left and right hydraulic clutches $C_L$ and $C_R$ are brought into their non-engaged states. Thus, the restraint of the carrier member 11 and the third sun gear 19 is released, so that the half shaft 9, the left drive shaft $A_L$, the right drive shaft $A_R$, the planetary carrier 8 and the carrier member 11 of the differential D are rotated in unison with one another. At this time, the torque of the engine E is transmitted through the differential D equally to the left and right front wheels $W_{FL}$ and $W_{FR}$.

During rightward turning of the vehicle, the right hydraulic clutch $C_R$ is brought into its engaged state through the electronic control unit U and the hydraulic pressure circuit H, thereby coupling the carrier member 11 to the casing 20 to stop the carrier member 11. At this time, the half shaft 9 and the left drive shaft $A_L$ rotated in unison with the left front wheel $W_{FL}$ and the right drive shaft $A_R$ rotated in unison with the right front wheel $W_{FR}$ (i.e., the planetary carrier 8 of the differential D) are interconnected through the second sun gear 18, the second pinion 14, the first pinion 13 and the first sun gear 17. Therefore, the number $N_L$ of revolutions of the left front wheel $W_{FL}$ is increased in a relation to the number $N_R$ of revolutions of the right front wheel $W_{FR}$, which is represented by the following equation:

$$N_L/N_R=(S_1/P_1)/(S_2/P_2)=1.1538 \qquad (5)$$

If the number $N_L$ of revolutions of the left front wheel $W_{FL}$ is increased relative to the number $N_R$ of revolutions of the right front wheel $W_{FR}$ in the above manner, a portion of the torque of the right front wheel $W_{FR}$ which is an inner wheel during turning of the vehicle can be transmitted to the left front wheel $W_{FL}$ which is an outer wheel during turning of the vehicle.

If the engagement force of the right hydraulic clutch $C_R$ is properly regulated to reduce the number of revolutions of the carrier member 11 in place of stopping the carrier member 11 by the right hydraulic clutch $C_R$, the number $N_L$ of revolutions of the left front wheel $W_{FL}$ can be increased relative to the number $N_R$ of revolutions of the right front wheel $W_{FR}$ in response to such reduction of the number of revolutions of the carrier member 11 to transmit any torque from the right front wheel $W_{FR}$ which is the inner wheel during turning of the vehicle to the left front wheel $W_{FL}$ which is the outer wheel during turning of the vehicle.

On the other hand, during leftward turning of the vehicle, the left hydraulic clutch $C_L$ is brought into its engaged state through the electronic unit U and the hydraulic pressure circuit H, thereby permitting the third pinion 15 to be coupled to the casing 20 through the third sun gear 19. As a result, the number of revolutions of the carrier member 11 is increased relative to the number of revolutions of the half shaft 9, and the number $N_R$ of revolutions of the right front wheel $W_{FR}$ is increased in a relationship to the number $N_L$ of revolutions of the left front wheel $W_{FL}$, which is represented by the following equation:

$$N_R/N_L=(S_3/P_3-S_1/P_1)/(S_3/P_3-S_2/P_2)=1.1555 \qquad (6)$$

If the number $N_R$ of revolutions of the right front wheel $W_{FR}$ is increased relative to the number $N_L$ of revolutions of the left front wheel $W_{FL}$ in the above manner, a portion of the torque of the left front wheel $W_{FL}$ which is the inner wheel during turning of the vehicle can be transmitted to the right front wheel $W_{FR}$ which is the outer wheel during turning of the vehicle. Even in this case, if the engagement force of the left hydraulic clutch $C_L$ is properly regulated to increase the number of revolutions of the carrier member 11, the number $N_R$ of revolutions of the right front wheel $W_{FR}$ can be increased relative to the number $N_L$ of revolutions of the left front wheel $W_{FL}$ in accordance with the increasing of the number $N_R$ of revolutions of the right front wheel $W_{FR}$, whereby any torque can be transmitted from the left front wheel $W_{FL}$ which is the inner wheel during turning of the vehicle to the right front wheel $W_{FR}$ which is the outer wheel during turning of the vehicle.

As apparent from the comparison of the equations (5) and (6) with each other, by setting numbers of teeth of the first, second and third pinions 13, 14 and 15 and the first, second and third sun gears 17, 18 and 19 at the above-described values, the ratio (about 1.1538) of increase in speed from the right $W_{FR}$ to the left front wheel $W_{FL}$ and the ratio (about 1.1555) of increase in speed from the left front wheel $W_{FL}$ to the right front wheel $W_{FR}$ can be substantially equalized to each other, and the difference between both of the ratios can be suppressed within no more than 0.15%. Thus, the distribution of the driving force to the left and right front wheels $W_{FL}$ and $W_{FR}$ can be performed laterally symmetrically without special provision of a difference between the driving force transmitting capacities of the left and right hydraulic clutches $C_L$ and $C_R$, or between the hydraulic pressures supplied to the left and right hydraulic clutches $C_L$ and $C_R$, thereby bringing about a reduction in cost by common use of parts of the left and right hydraulic clutches $C_L$ and $C_R$ and by the simplification of the driving system.

Although the embodiment of the present invention has been described in detail, it will be understood that the present invention is not limited to the above-described embodiment, and various modifications may be made without departing from the spirit and scope of the invention defined in claims.

Figure 9B:
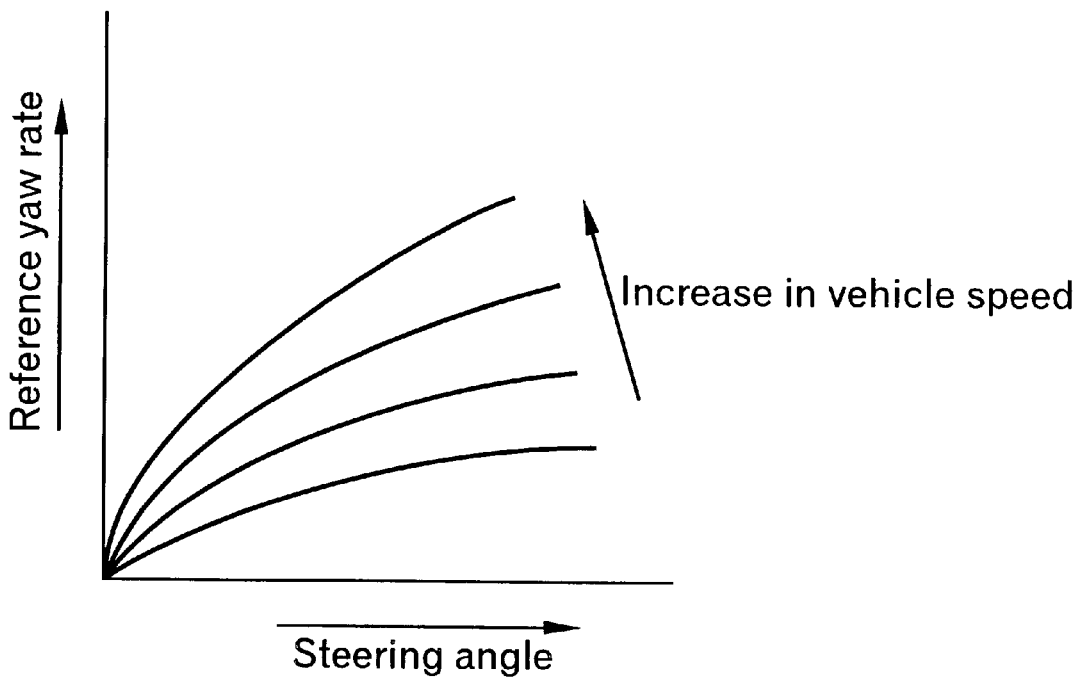

For example, the reference yaw rate has been calculated using the vehicle speed and the lateral acceleration as parameters in the embodiment, but the reference yaw rate may be calculated from the vehicle model shown in FIG. 9B using the vehicle speed and the steering angle. In addition, the embodiment has been described with regard to the driving force distributing device, but the present invention is also applicable to a braking force distributing device for distributing a braking force to the left and right wheels to generate a yaw moment. Further, the hydraulic clutches $C_L$ and $C_R$ have been illustrated as the hydraulic actuators in the embodiment, but other any hydraulic actuators may be utilized.

What is claimed is:

1. A process for controlling yaw moment of a vehicle, said process comprising the steps of:

determining a distribution amount of a driving force or a braking force by a feed-forward control;

decreasing the distribution amount by a feedback control, when an over-steered state of the vehicle is detected, wherein said determining step and said decreasing step distribute the driving force or the braking force to left and right wheels of the vehicle, and wherein said determining step comprises determining a turned amount of said vehicle based on a lateral acceleration of the vehicle detected by a lateral acceleration sensor and a presumed lateral acceleration which is presumed based on vehicle operating conditions other than said lateral acceleration;

determining a driving force for the vehicle based on a gear ratio and an engine torque; and determining said distribution amount of the driving force or the braking force to said left and right wheels of the vehicle, based on said turned amount of the vehicle and said driving force for the vehicle.

2. An apparatus for controlling yaw moment in a vehicle, said apparatus comprising:

feed-forward control means for determining a distribution amount of a driving force or a braking force of a vehicle;

feedback control means for decreasing the distribution amount when an over-steered state of the vehicle is detected;

detecting means, coupled to said feedback control means, for detecting an over-steered state of the vehicle; and sensors for detecting operating conditions of the vehicle including a lateral acceleration of the vehicle, wherein said feed-forward control means comprises means for calculating a presumed lateral acceleration of the vehicle based on said operating conditions detected by said sensors other than said lateral acceleration;

means for determining a turned amount of the vehicle based on said lateral acceleration and said presumed lateral acceleration;

means for determining a driving force for the vehicle based on a gear ratio and an engine torque; and means for determining said distribution amount of the driving force or the braking force to left and right wheels of the vehicle, based on said turned amount of the vehicle and said driving force for the vehicle.

* * * * *